United States Patent Office 3,028,370
Patented Apr. 3, 1962

3,028,370
THERMOSETTING RESINS
Charles E. Wheelock, Bartlesville, Okla., assignor to Phillips Petroleum Company, a corporation of Delaware
No Drawing. Filed Sept. 9, 1957, Ser. No. 682,618
5 Claims. (Cl. 260—78.4)

This invention relates to thermosetting resins prepared from epoxidized liquid diene polymers. In copending applications, Serial No. 612,890, filed September 28, 1956, and Serial No. 626,286, filed December 5, 1956, epoxidized diene polymers have been described. These epoxy compounds are those wherein an oxygen atom bridges adjacent carbon atoms, said carbon atoms being joined by a single valence bond. It is further disclosed therein that these polymers are useful as resins for varying uses such as laminating, casting, and coating compositions. I have now discovered another curing system for epoxidized polymers of this type.

The following are objects of my invention.

An object of this invention is to provide thermosetting resins. A further object of this invention is to provide an improved curing system for epoxidized liquid polybutadiene.

Other objects and advantages of this invention will become apparent to one skilled in the art upon reading the accompanying disclosure.

Broadly, the present invention relates to a thermosetting resin comprising a mixture of an epoxidized diene polymer containing 0.08 to 0.8 epoxy group per aliphatic double bond originally present in the polymer and based on 100 parts by weight of said epoxidized polymer, (A) 5 to 50 parts of an acid anhydride of the formula

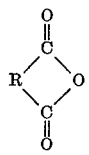

where R is a divalent hydrocarbon radical, and (B) 5 to 50 parts of an organic compound containing ethylenic unsaturation. The resulting products are suitable for use in the preparation of coatings, moldings, laminates, sheets, and other products.

When the resins are prepared from homopolymers of butadiene, the products are characterized in that the original unsaturated portion of the molecule is converted by the epoxidation reaction to units of which (1) 8 to 70 percent, preferably 13 to 50 percent, of said units are selected from the group consisting of

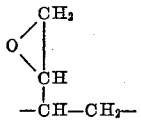

and

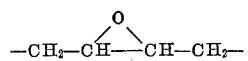

(2) up to 82 percent, preferably 50 to 77 percent, of said units are selected from the group consisting of

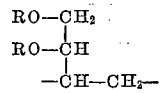

and

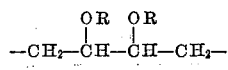

where R is selected from the group consisting of H and

$R_1$ being an alkyl, aryl, alkaryl or aralkyl group of one to 20 carbon atoms, and (3) 10 to 35 percent of said units are selected from the group consisting of

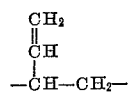

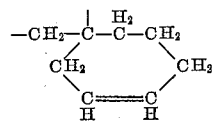

and —$CH_2$—$CH$=$CH$—$CH_2$—.

Of course, the present invention is not limited to these polymers but includes polymers, including copolymers, of dienes containing 4 to 6 carbon atoms. Furthermore, other monomers can be used in preparing the copolymers such as styrene, substituted styrene, vinyl ethyl ether, acrylonitrile, methacrylonitrile, ethyl acrylate, and the like. The liquid polymers can be prepared by any suitable method for preparing these including the use of sufficient amounts of mercaptan modifiers in emulsion polymerization systems to produce liquid polymers and by mass polymerization using finely divided alkali metal catalysts. A particularly preferred method is that described in Crouch 2,631,175. The products, following epoxidation, are preferably liquids within the temperature range 0 to 100° C. having a viscosity up to 500,000 centipoises.

The first component of the curing systems of the present invention is an anhydride of a polycarboxylic acid. Suitable acid anhydrides include maleic, succinic, methylsuccinic, glutaric, itaconic, glutaconic, diglycolic, dithiodiglycolic, acetonedicarboxylic, N - methyliminodiacetic, adipic, 1-amino-2-hydroxypentadioic, phthalic, and tetrahydrophthalic.

The second component which is added to the epoxidized liquid polymer is a monomer containing aliphatic unsaturation which is reactive with the epoxidized liquid polymer. Respective examples of the group include cyclohexene, 1,3-butadiene, 2,3-dimethyl-1,3-butadiene, 2,4-octadiene, styrene, divinylbenzene such as 1,3-divinylbenzene, vinyltoluene such as 3-vinyltoluene, vinylnaphthalene, such as 2-vinylnaphthalene, heterocyclic nitrogen base derivatives such as vinylpyridine, 2-methyl-5-vinylpyridine, vinylquinoline, N-vinylpyrrole, and N-vinylcarbazole, and related monomers such as the methacrylates, methyl methacrylate, for example, and derivatives of cyanuric acid such as for allyl cyanurate. Suitable monomers are those which are dispersible or soluble in the polymer at the temperatures involved. A molecular weight range of 50 to 250 is generally suitable.

In some of the work on my invention I have also used additional ingredients to improve the final product. These include driers and peroxide compounds. The driers are those commonly used in coating compositions and include cobalt, lead and manganese salts such as the naphthenates, oleates, resinates, and stearates. The peroxides which are preferred include benzoyl peroxide, tert-butyl perbenzoate, tert-butyl hydroperoxide, cumene hydroperoxide, and cyclohexyl hydroperoxide. Polyamines such as diethylenetriamine can also be used as an additional ingredient to improve the final product.

The amounts of these various ingredients above described are in the following ranges, all amounts being based upon 100 parts by weight of the epoxidized diene polymer.

| | |
|---|---|
| Acid or acid anhydride | 5–50 |
| Monomer containing aliphatic unsaturation | 5–50 |
| Driers | 0.01–1.0 |
| Peroxide | 0.05–5 |

Temperatures for cure can range from 20 to 260° C. although I prefer to operate below 200° C. The time of cure is largely dependent on the temperature ranging from less than one hour at the higher temperatures to 24 hours or more at the lower temperatures. Superatmospheric pressures can be used to prevent loss of volatile materials when necessary.

The following example sets forth specific resins made according to the above general description.

EXAMPLE

Liquid polybutadiene, prepared according to the method of Crouch 2,631,175 and having a viscosity of approximately 1500 Saybolt Furol seconds at 100° F. and an unsaturation of 80 percent of theoretical, e.g. 0.8 double bond per $C_4$ unit, was stripped by flushing for 45 minutes with nitrogen at a temperature between 380 and 400° F. at a pressure between 10 and 20 mm. Hg absolute. This polymer was epoxidized by dissolving 432 grams of the polymer in two liters of chloroform to which was added 280 grams of a nuclear sulfonated ion exchange resin (Amberlite IR–120) in the acid form and 35 mls. of glacial acetic acid. The temperature was 43° C. To this mixture there was added 266 grams of 50 percent hydrogen peroxide over a period of 30 to 40 minutes while maintaining the temperature at 43° C. The mixture was stirred for 2.5 hours at this temperature. Then 500 milliliters of water were added, the aqueous phase was removed, and the polymeric product washed several times with dilute aqueous sodium bicarbonate and then with water. The neutral organic phase was dried over anhydrous sodium sulfate and the solvent was stripped by warming under vacuum.

The thus prepared epoxidized polymer was then analyzed for epoxy oxygen content and total oxygen content. Epoxy oxygen content was determined by the hydrochloric acid-dioxane method given in Organic Analysis, Mitchell et al., volume I, pages 135–136, Interscience Publishers, Inc., New York (1953). Total oxygen content was determined by pyrrolyzing the sample in an atmosphere of nitrogen, converting the oxygen compounds formed to carbon monoxide by passage of the gases over carbon at a temperature of 1120° C., passing the gases through a liquid nitrogen trap to remove interfering substances, oxidizing the carbon monoxide to carbon dioxide by means of copper oxide kept at a temperature of 300° C., collecting the resulting carbon dioxide in a liquid nitrogen trap, and, after pumping out the residual gases by means of a vacuum pump, determining the carbon dioxide manometrically in a standard volume.

The epoxidized liquid polybutadiene, prepared and analyzed by the above described procedure, was found to have an epoxy oxygen content of 3.9 percent by weight and a total oxygen content of 10.8 percent on the same basis. Assuming that all of the oxygen was present as either epoxy oxygen or hydroxyl oxygen it was calculated that the epoxidized polymer contained 0.185 epoxy group per double bond originally present in the liquid polybutadiene.

This epoxidized polymer was used for a series of runs to show the effectiveness of various cure systems. In each case, after all ingredients were added, the viscosity of the mixture was determined at room temperature with a Brookfield viscometer using a No. 7 spindle rotating at 100 r.p.m. except for run 2 wherein the 10 r.p.m. speed was used. The products were cured at 100° C. for periods of time up to 85 hours and the Shore D hardness was measured at room temperature. This cure temperature is at the lower end of the useful range but is used to bring out the differences between the various runs. The results of these tests are shown in the accompanying table, Table I.

Table I

| | Parts by weight in mixture | | | | | | Initial Viscosity, cp. | Shore D hardness after curing | | | | | | |
|---|---|---|---|---|---|---|---|---|---|---|---|---|---|---|
| Run No. | Epoxidized Polybutadiene | Maleic Anhydride | Styrene | Triallyl Cyanurate | Cobalt Liquid [1] | Tert-Butyl Hydroperoxide | | 3 hrs. | 5 hrs. | 7 hrs. | 10 hrs. | 14 hrs. | 77 hrs. | 85 hrs. |
| 1 | 100 | | | | | | 400,000 | 0 | | 0 | 0 | 1 | 5 | 6 |
| 2 | 100 | | | | | | 369,000 | 8 | | 24 | 30 | 35 | 74 | 85 |
| 3 | 100 | | 30 | | | | 3,240 | | 0 | 0 | 2 | 4 | | |
| 4 | 100 | | | 30 | | | 29,560 | | 0 | 0 | 1 | 2 | | |
| 5 | 100 | 11.1 | 33.4 | | | | 1,200 | | 30 | 41 | 46 | 54 | 70 | |
| 6 | 100 | 25 | 37.5 | | | | 1,040 | | 75 | 80 | 82 | 85 | | |
| 7 | 100 | 25 | 37.5 | | 0.49 | 1.12 | 1,040 | | 80 | 85 | 88 | 88 | | |
| 8 | 100 | 42.8 | | 42.8 | 0.83 | 1.9 | 3,040 | | 50 | 71 | 81 | 85 | | |

[1] Cobalt liquid is a 6 percent solution of cobalt naphthenate (Harshaw, Uversol cobalt liquid), and has a specific gravity of 0.97 grams/cc.

Run 1 shows that the polymer alone developed no hardness at the end of 10 hours and that the hardness slowly increased to 6 at 85 hours. Runs 2, 3, and 4 illustrated the effect of the various additives used separately and runs 5 through 8 illustrate the highly accelerated cure obtained using the combination system of my invention. This table also illustrates that considerably more rapid cures are obtained by operation according to my invention.

Runs 5 through 8 also show another valuable property of the resins of my invention. This is the fact that the viscosity before curing is quite low (in the neighborhood of 3000 and below) and this low viscosity greatly simplifies the handling and application of the material.

As many possible embodiments can be made from this invention without departing from the scope thereof, it is to be understood that all matter herein set forth is to be interpreted as illustrative and not as unduly limiting the invention.

I claim:

1. A resin produced by maintaining at a temperature of 20 to 260° C. for 1 to 24 hours a mixture of an epoxidized polymer of butadiene, 8 to 70 percent of the $C_4$ units in said polymer selected from the group consisting of

and

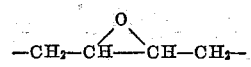

up to 82 percent of the C$_4$ units selected from the group consisting of

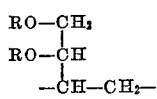

and

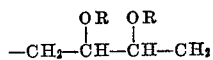

where R is selected from the group consisting of H and

R$_1$ being a hydrocarbyl group of 1 to 20 carbon atoms, and 10 to 35 percent of the C$_4$ units selected from the group consisting of

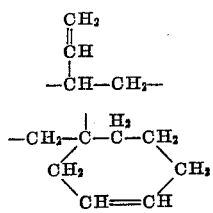

and —CH$_2$—CH=CH—CH$_2$— and based on 100 parts by weight of said epoxidized polymer, 5 to 50 parts of an acid anhydride of the formula

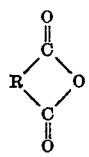

where R is a divalent radical and 5 to 50 parts of an organic compound containing at least one terminal vinylidene group, said latter compound being different from but reactive with said epoxidized polymer and different from said anhydride and having a molecular weight in the range of 50 to 250.

2. The resin of claim 1 wherein said acid anhydride is maleic anhydride and said compound containing at least one terminal vinylidene group is styrene.

3. The resin of claim 1 wherein said acid anhydride is maleic anhydride and said compound containing at least one terminal vinylidene group is triallyl cyanurate.

4. The resin of claim 2 wherein said mixture also contains 0.05 to 5 parts of tert-butyl hydroperoxide.

5. The resin of claim 3 wherein said mixture also contains 0.05 to 5 parts of tert-butyl hydroperoxide.

References Cited in the file of this patent
UNITED STATES PATENTS

| | | |
|---|---|---|
| 2,399,214 | Evans et al. | Apr. 30, 1946 |
| 2,450,234 | Evans et al. | Sept. 28, 1948 |
| 2,527,806 | Foster | Oct. 31, 1950 |
| 2,660,563 | Banes et al. | Nov. 24, 1953 |
| 2,765,296 | Strain | Oct. 2, 1956 |
| 2,768,153 | Shokal | Oct. 23, 1956 |
| 2,781,333 | Updegraff | Feb. 12, 1957 |
| 2,810,706 | Frazier et al. | Oct. 22, 1957 |
| 2,826,556 | Greenspan et al. | Mar. 11, 1958 |
| 2,826,618 | Gleason | Mar. 11, 1958 |
| 2,829,130 | Greenspan | Apr. 1, 1958 |
| 2,829,135 | Greenspan | Apr. 1, 1958 |
| 2,830,031 | Fisch | Apr. 8, 1958 |
| 2,848,433 | Eirich | Aug. 19, 1958 |
| 2,870,125 | Payne et al. | Jan. 20, 1959 |
| 2,949,441 | Newey | Aug. 16, 1960 |

FOREIGN PATENTS

| | | |
|---|---|---|
| 369,716 | Great Britain | Mar. 31, 1932 |
| 369,725 | Great Britain | Mar. 31, 1932 |